(12) United States Patent
Shaw

(10) Patent No.: US 6,398,238 B1
(45) Date of Patent: Jun. 4, 2002

(54) STEERING CONTROL MECHANISM FOR KICK SCOOTER

(76) Inventor: Anthony Shaw, 21F-3, No. 218, Feng Chia Road, Taichung (TW)

( * ) Notice: Subject to any disclaimer, the term of this patent is extended or adjusted under 35 U.S.C. 154(b) by 0 days.

(21) Appl. No.: 09/865,556

(22) Filed: May 29, 2001

(51) Int. Cl.[7] .............................................. A63C 17/00
(52) U.S. Cl. ............................ 280/87.042; 280/87.041; 280/11.28
(58) Field of Search ......................... 280/87.01, 87.021, 280/87.041, 87.042, 11.27, 11.28, 124.125, 89.1, 89.11, 89.12

(56) References Cited

U.S. PATENT DOCUMENTS

| | | | | |
|---|---|---|---|---|
| 1,398,588 A | * | 11/1921 | Eccard | 280/124.125 |
| 1,834,883 A | * | 12/1931 | Welikes | 280/124.125 |
| 4,054,297 A | * | 10/1977 | Solimine | 280/87.042 |
| 4,580,462 A | * | 4/1986 | Rehlander | 280/89.11 |
| 5,330,214 A | * | 7/1994 | Brooks et al. | 280/87.042 |
| 5,924,710 A | * | 7/1999 | Milne | 280/87.042 |
| 6,149,170 A | * | 11/2000 | Dotson | 280/87.021 |
| 6,158,752 A | * | 12/2000 | Kay | 280/87.042 |
| 6,206,388 B1 | * | 3/2001 | Ouboter | 280/87.042 |
| 6,279,930 B1 | * | 8/2001 | Chang et al. | 280/87.042 |
| 6,286,843 B1 | * | 9/2001 | Lin | 280/87.042 |

* cited by examiner

*Primary Examiner*—Michael Mar
(74) *Attorney, Agent, or Firm*—Browdy and Neimark, P.L.L.C.

(57) ABSTRACT

A steering control mechanism formed of a base, two steering bars, an intermediate block, and two links, and installed in a kick scooter to function as two parallel four-bar linkages for controlling the steering direction of the front wheels of the kick scooter.

4 Claims, 4 Drawing Sheets

STEERING CONTROL MECHANISM FOR KICK SCOOTER

BACKGROUND OF THE INVENTION

The present invent to kick scooters and, more specifically, to a steering mechanism for kick scooter.

Regular kick scooters include two-wheel type and three-wheel type. A two-wheel kick scooter is generally comprised of a footplate, an upright handle fixedly provided at the front side of the footplate, and two wheels respectively provided at the front and rear side of the bottom sidewall of the footplate. When riding, the rider holds the handle with the hands to control the steering direction of the kick scooter. A three-wheel kick scooter comprises a footplate, two front wheels, a rear wheel provided at the rear side of the footplate, and two linkages coupled between the front side of the footplate and the two front wheels. When the rider gives a pressure to the left (right) side of the footplate during riding, the front wheels are biased leftwards (rightwards), and therefore the kick scooter is turned leftwards (rightwards). The linkages are simple. However, it is difficult to smoothly stably control the steering of the kick scooter when changing the steering direction of the kick scooter.

SUMMARY OF THE INVENTION

It is the main object of the present invention to provide a steering control mechanism for kick scooter, which enables the kick scooter to change its steering direction smoothly and stably. The steering control mechanism of the invention is installed in the main body of a kick scooter and adapted to control the steering direction of two front wheels of the kick scooter, comprising a base fixedly fastened to the main body of the kick scooter; two steering bars, the steering bars each comprising a front pivot end respectively pivoted to two distal ends of the base, a rear coupling end, and a middle side rod respectively connected to the front wheels of the kick scooter for enabling the front wheels to be synchronous biased with the steering bars; an intermediate block pivoted to a middle part of the base equally spaced between the steering bars, the intermediate block having a rear free end horizontally oscillated with the intermediate block within a limited angle; and two links, the links each having one end respectively pivoted to the rear coupling end of each of the steering bars and an opposite end respectively pivoted to the rear free end of each of the steering bars to form with the intermediate block, the steering bars and the base two parallel four-bar linkages.

DETAILED DESCRIPTION OF THE PREFERRED EMBODIMENT

Figure 1:
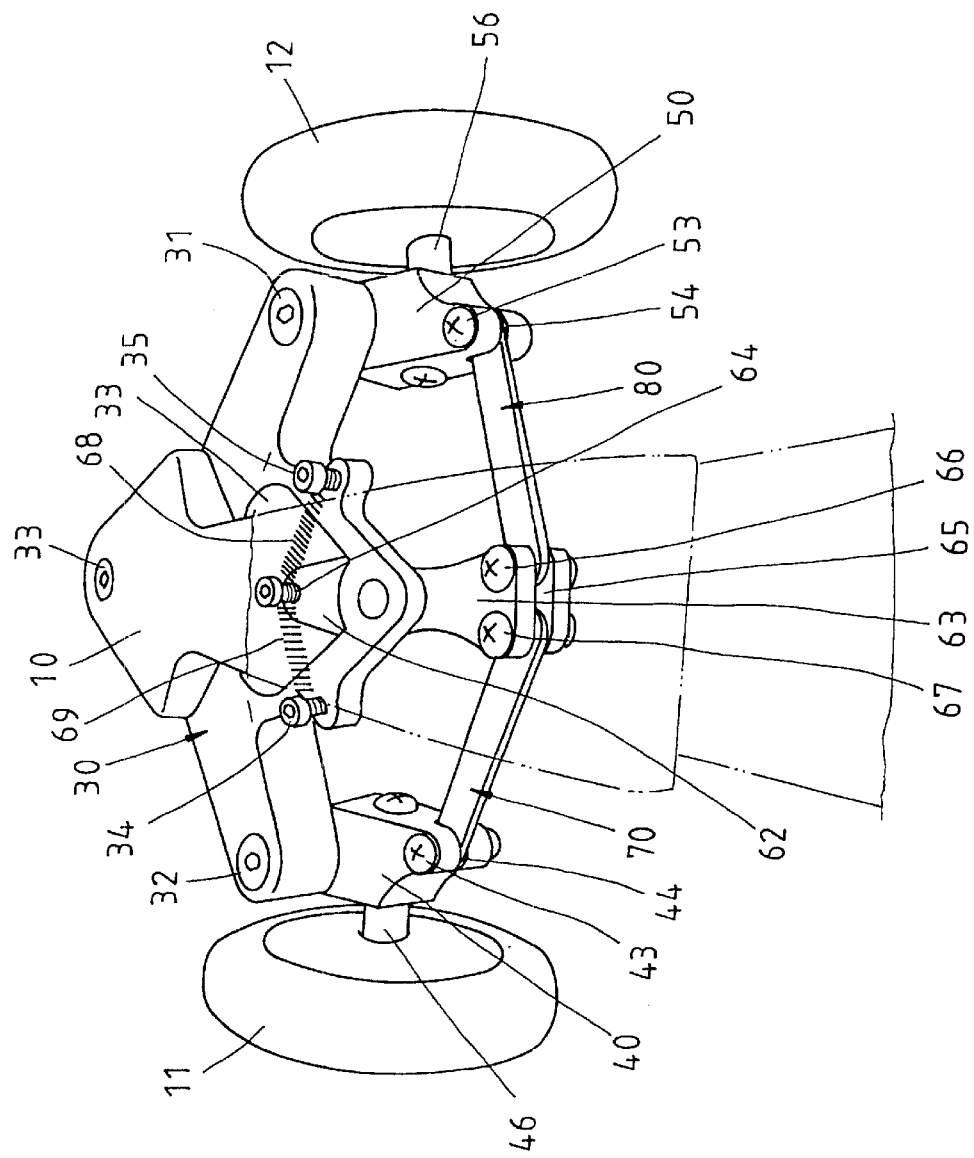
FIG. 1 is an oblique top elevation of the steering control mechanism according to the present invention.
Figure 2:
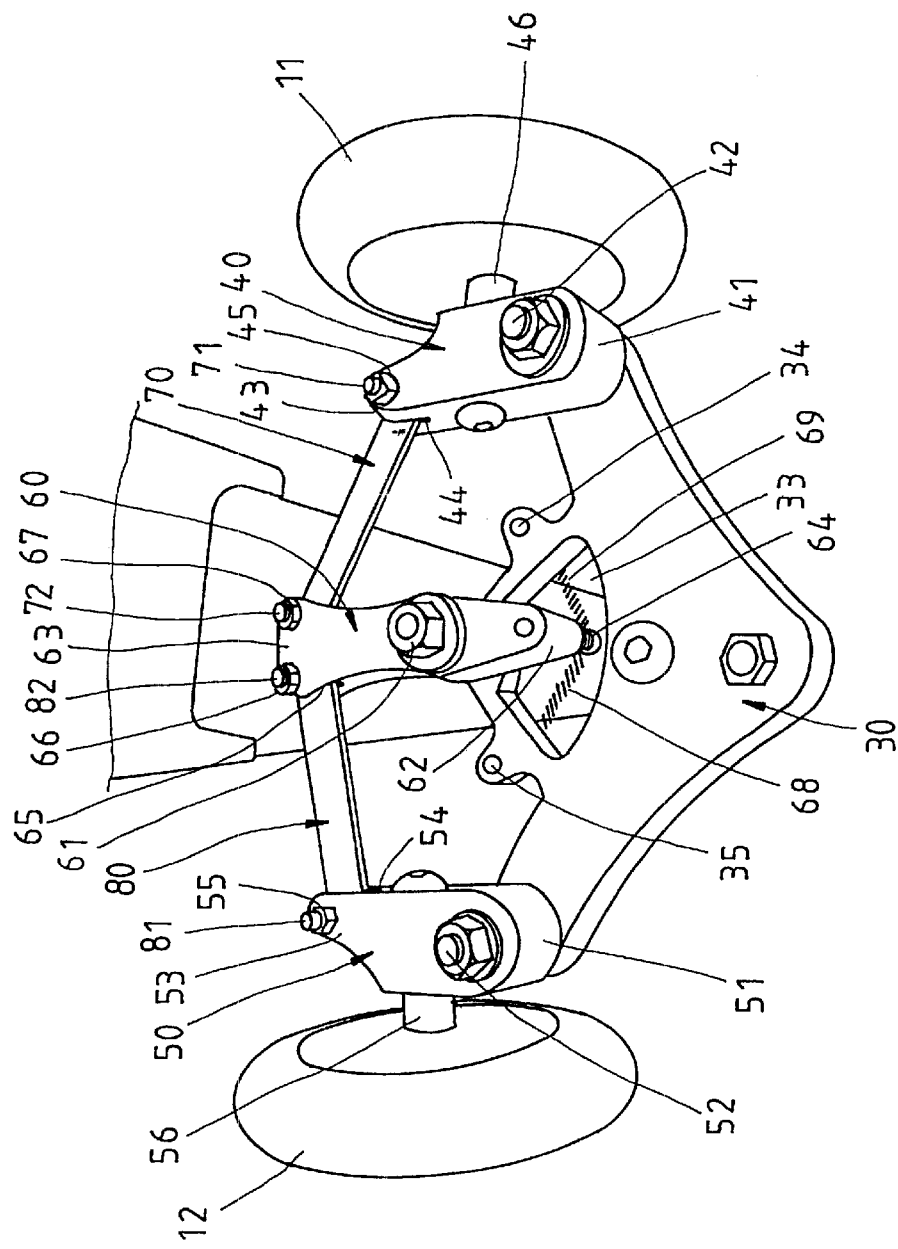
FIG. 2 is a bottom view of FIG. 1.

Referring to FIGS. 1 and 2, a steering control mechanism 20 is shown installed in the main body 10 of a kick scooter at the front side, and adapted to control the steering of the two front wheels 11;12 of the kick scooter. The steering control mechanism 20 is comprised of a base 30, two steering bars 40;50, an intermediate block 60, and two links 70;80.

The base 30 is a substantially V-shaped frame having two pivot holes 31;32 respectively disposed at two distal ends thereof, a sector-like opening 33 on the middle, and two rods 34;35 disposed at two sides of the sector-like opening 33.

The steering bars 40;50 each comprise a front pivot end 41 or 51 respectively pivoted to the pivot holes 31;32 of the base 30 by a respective pivot bolt 42 or 52, a rear coupling end 43 or 53, a horizontal end notch 44 or 54 in the rear coupling end 43 or 53, a vertical through hole 45 or 55 extended through the rear coupling end 43 or 53 across the horizontal end notch 44 or 54, and a side rod 46 horizontally disposed on the middle and respectively connected to the front wheels 11;12 of the kick scooter for enabling the front wheels 11;12 to be synchronously biased with the steering bars 40;50.

The intermediate block 60 has a middle part pivoted to a middle part of the base 30 by a pivot bolt 61, a front limitation end 62, a rear free end 63, a fixed rod 64 fixedly provided at the front limitation end 62 and moved with the intermediately block 60 in the sector-like opening 33 of the base 30 to limit the swinging angle of the rear free end 63, a horizontal end notch 65 in the rear free end 63, two vertical pivot holes 66;67 respectively extended through the rear free end 63 across the horizontal end notch 65, and two springs 68;69 each having one end connected to the fixed rod 64 and an opposite end respectively connected to the rods 34;35 of the base 30. The springs 68;69 impart a return force to the front limitation end 62 of the intermediate block 60 to return the intermediate block 60 to the center position after each leftward or rightward displacement.

The two links 70;80 have respective distal ends respectively inserted into the horizontal end notches 44;54 of the steering bars 40;50 and the horizontal end notch 65 of the intermediate block 60 and respectively pivoted thereto by respective pivot bolts 71;72;81;82. Thus, the steering bars 40;50, the intermediate block 60, and the two links 70;80 form two parallel four-bar linkages, so that when one front wheel 11 is turned through one angle, the other front wheel 12 is synchronously biased.

Figure 3:
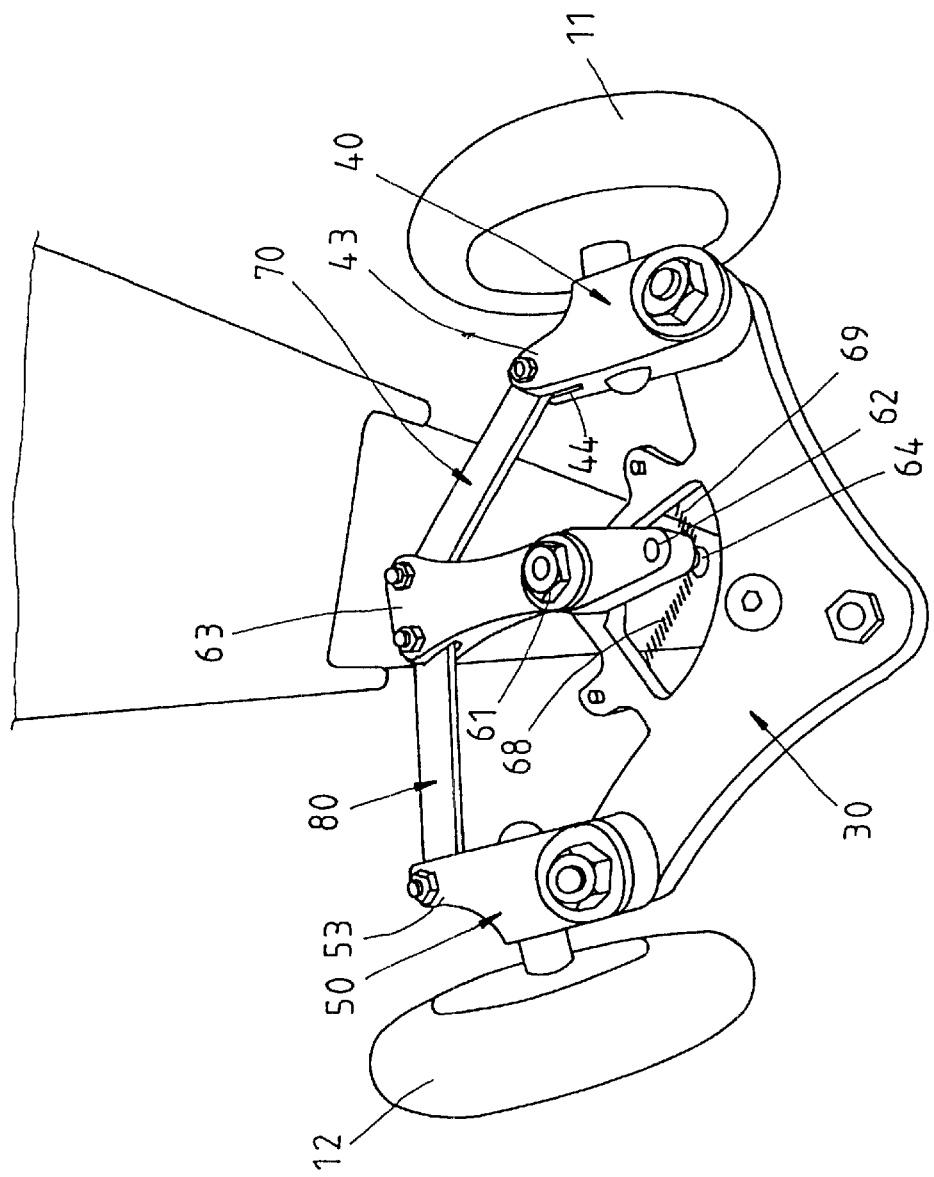
FIG. 3 illustrates the steering control mechanism operated, the front wheels biased leftwards according to the present invention.

Referring to FIG. 3, when the rider gives a pressure to the left side of the footplate of the kick scooter to turn the corresponding front wheel 11 leftwards, the rear coupling end 43 of the corresponding steering bar 40 is turned with the steering bar 40 about the pivot bolt 42 leftwards, causing the rear free end 63 of the intermediate block 60 to be turned with the intermediate block 60 leftwards. At this time, the front limitation end 62 of the intermediate block 60 is moved with the intermediate block 60 rightwards in the sector-like opening 34 of the base 30 to compress one spring 69 and to stretch the other spring 68. The swinging of the intermediate block 60 forces the link 80 against the rear coupling end 53 of the steering bar 50, thereby causing the steering bar 50 to be turned leftwards, and therefore the front wheel 12 is synchronously biased with the steering bar 50. When the pressure is disappeared, the springs 68;69 immediately pull the intermediate block 60 back to the center position, and therefore the front wheels 11;12 are returned to the center position as shown in FIG. 2.

Figure 4:
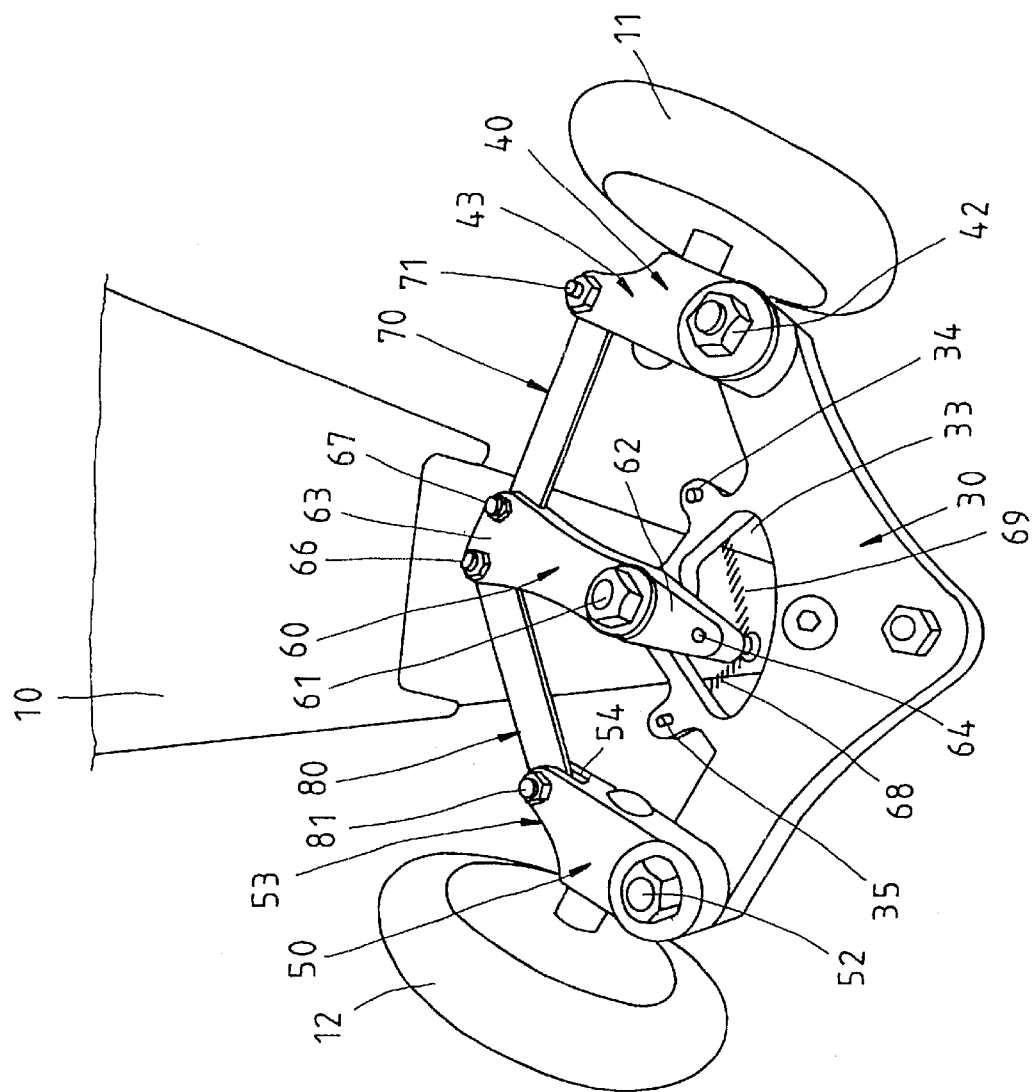
FIG. 4 illustrates the steering control mechanism operated, the front wheels biased rightwards according to the present invention.

On the contrary, when the rider gives a pressure to the right side of the footplate of the kick scooter to turn the corresponding front wheel 12 rightwards as shown in FIG. 4, the rear coupling end 43 of the steering bar 40 is turned with the steering bar 40 about the pivot bolt 42 rightwards, causing the rear free end 63 of the intermediate block 60 to be turned with the intermediate block 60 rightwards. At this time, the front limitation end 62 of the intermediate block 60 is moved with the intermediate block 60 leftwards in the sector-like opening 34 of the base 30 to compress one spring 68 and to stretch the other spring 69. The swinging of the intermediate block 60 forces the link 80 against the rear coupling end 53 of the steering bar 50, thereby causing the steering bar 50 to be turned rightwards, and therefore the front wheel 12 is synchronously biased with the steering bar 50. When the pressure is disappeared, the springs 68;69 immediately pull the intermediate block 60 back to the center position, and therefore the front wheels 11;12 are returned to the center position as shown in FIG. 2.

As indicated above, the base 30, the intermediate block 60, the links 70;80, and the steering bars 40;50 form two parallel four-bar linkages, for enabling the two front wheels 11;12 to be synchronously smoothly biased when the rider changes the steering direction of the kick scooter.

A prototype of steering control mechanism for kick scooter has been constructed with the features of FIGS. 1~4. The steering control mechanism for kick scooter functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A steering control mechanism installed in the main body of a kick scooter and adapted to control the steering direction of two front wheels of the kick scooter, comprising:

a base fixedly fastened to the main body of the kick scooter;

two steering bars, said steering bars each comprising a front pivot end respectively pivoted to two distal ends of said base, a rear coupling end, and a middle side rod respectively connected to the front wheels of the kick scooter for enabling the front wheels to be synchronous biased with said steering bars;

an intermediate block pivoted to a middle part of said base equally spaced between said steering bars, said intermediate block having a rear free end horizontally oscillated with said intermediate block within a limited angle;

two links, said links each having one end respectively pivoted to the rear coupling end of each of said steering bars and an opposite end respectively pivoted to the rear free end of said intermediate block to form with said intermediate block, said steering bars and said base, two parallel four-bar linkages;

wherein said base comprises a sector-shaped opening in the middle part of said base, and said intermediate block has a middle part pivoted to said base, a front limitation end, and a fixed rod fixedly provided at said front limitation end and movable with said intermediate block in the sector-like opening of said base to limit the turning angle of said intermediate block relative to said base.

2. The steering control mechanism of claim 1 further comprising two spring members bilaterally connected between said base and said intermediate block, said spring members each having one end respectively connected to the fixed rod of said intermediate block and an opposite end respectively connected to said base.

3. The steering control mechanism of claim 2 wherein said base comprises two rods disposed at two sides of said sector-shaped opening and respectively connected to said spring members.

4. A The steering control mechanism of claim 1 wherein the rear free end of said intermediate block comprises a horizontal end notch, the rear coupling end of each of said steering bars have a horizontal end notch, and said links each have one end respectively inserted into the horizontal end notch of the free end of said intermediate block and pivoted thereto by pivot means and an opposite end respectively inserted into the horizontal end notch of each of said steering bars and pivoted thereto by a respective pivot means.

* * * * *